United States Patent [19]

Sato

[11] Patent Number: 4,689,606

[45] Date of Patent: Aug. 25, 1987

[54] DATA ENCODING/DECODING CIRCUIT

[75] Inventor: Toshifumi Sato, Tokyo, Japan

[73] Assignee: NEC Corporation, Tokyo, Japan

[21] Appl. No.: 878,546

[22] Filed: Jun. 25, 1986

[30] Foreign Application Priority Data

Jun. 25, 1985 [JP] Japan ................................ 60-138405

[51] Int. Cl.$^4$ .............................................. H04L 9/00
[52] U.S. Cl. ............................... 340/347 DD; 380/46
[58] Field of Search ............ 340/347 DD; 380/42–50; 364/717

[56] References Cited

U.S. PATENT DOCUMENTS

| | | | |
|---|---|---|---|
| 3,852,534 | 12/1974 | Tilk | 380/46 |
| 4,202,051 | 5/1980 | Davida | 380/46 |
| 4,369,434 | 1/1983 | Mueller | 340/347 DD |

OTHER PUBLICATIONS

"Privacy and Authentication: An Introduction to Cryptography", Proceedings of the IEEE, vol. 67, No. 3, Mar. 1979.
"Data Encryption Equipment", Sep. 1984–vol. 22, No. 9.

Primary Examiner—Charles D. Miller
Attorney, Agent, or Firm—Sughrue, Mion, Zinn, Macpeak and Seas

[57] ABSTRACT

In a data encoding/decoding circuit, a data encoding circuit includes a first clock, a first time setting circuit, a first random number generator, and a converter for receiving transmission data and converting the transmission data into output data with frame sync signals. A data decoding circuit includes a second clock, a second time setting circuit, a frame sync extracting circuit, a time correction circuit for correcting the time of the second clock, a second random number generator, and an inverter for inverting output data from the frame sync extracting circuit with a random number from the second random number generator and outputting the inverted data as decoded data.

4 Claims, 8 Drawing Figures

DATA ENCODING/DECODING CIRCUIT

BACKGROUND OF THE INVENTION

The present invention relates to a data encoding/decoding circuit and, more particularly, to a scrambler/descrambler for inhibiting access of data by tapping or illegal data access.

A data encoding/decoding circuit of this type is arranged according to one of the following three systems.

FIG. 1 is a block diagram of a conventional data encoding/decoding circuit of the first system. Referring to FIG. 1, a data encoding circuit 1 comprises a shift register 11, a random number generator 12 and an exclusive OR gate, i.e., an adder 13 of modulo 2 (to be referred to as an adder 13 hereinafter). In the data encoding circuit 1, the random number generator 12 generates a random number as a function of a value of the content of the shift register 11. Transmission data input to a terminal 14 is added to the random number by the adder 13 and appears as a transmission data output at a terminal 15. At the same time, the sum is supplied to the shift register 11. A data decoding circuit 2 comprises a shift register 21, a random number generator 22, and an adder 23. In the data decoding circuit 2, the random number generator 22 generates a random number as a function of a value of the content of the shift register 21. The reception data input to a terminal 24 is added to the random number by the adder 23, and the sum appears as a reception data output at a terminal 25. The input reception data is also supplied to the shift register 21. Unless an error occurs on a transmission line 3, the values of the contents of the shift registers 11 and 21 in the data encoding and decoding circuits 1 and 2 are the same, and the random numbers are identical accordingly. Therefore, data corresponding to the input to the input terminal 14 of the data encoding circuit 1 appears at the output terminal 25 of the data decoding circuit 2.

FIG. 2 is a block diagram of a conventional data encoding/decoding circuit of the second system. Referring to FIG. 2, a data encoding circuit 4 comprises a frame counter 41, a random number generator 42, a frame sync inserting circuit 43, and an adder 44. A data decoding circuit 5 comprises a frame counter 51, a random number generator 52, a frame sync extracting circuit 53, and an adder 54. If one frame length consists of NF bits, the frame counters 41 and 51 are respectively counters of base-NF, each representing the current bit position in the frame. The random number generators 42 and 52 respectively generate random numbers as a function of values of the contents of the frame counters 41 and 51.

In the data encoding circuit 4, transmission data input to an input terminal 45 is added by the adder 44 to the random number output from the random number generator 42. Sum data is supplied to the frame sync inserting circuit 43. The frame sync inserting circuit 43 inserts the frame sync signal into the output from the adder 44, in response to the signal supplied from the frame counter 41. The transmission data is sent from an output terminal 46 onto a transmission line 6. The transmission data is supplied to an input terminal 55 of the data decoding circuit 5, and then to the frame sync extracting circuit 53. The frame sync signal is extracted by the extracting circuit 53. The extracted frame sync signal is supplied to the frame counter 51 to properly set its initial value. An output (excluding the frame sync signal) from the frame sync extracting circuit 53 is supplied to the adder 54, and is added to the corresponding random number. An output from the adder 54 appears as reception data at an output terminal 56. As long as the contents of the frame counters 41 and 51 in the data encoding and decoding circuits 4 and 5 coincide with each other, the random numbers from the random number generators 42 and 52 are the same. Therefore, accurate decoding can be performed.

FIG. 3 is a block diagram of a conventional encoding/decoding circuit of the third system. Referring to FIG. 3, a data encoding circuit 7 comprises a shift register 71, a random number generator 72, an adder 73, a switching circuit 74, and a multiplexer 75. A data decoding circuit 8 comprises a shift register 81, a random number generator 82, an adder 83, a switching circuit 84, and a demultiplexer 85. At the beginning of transmission, an initial value is supplied from an input terminal 76 to the shift register 71 through the switching circuit 74. The random number generator 72 generates a random number as a function of a value of the content of the shift register 71. The input data at a terminal 77 and the random number are added by the adder 73, and sum data is supplied to the multiplexer 75. The multiplexer 75 multiplexes the input data and the initial value. The multiplexed data is sent as the transmission data output onto a transmission line 9.

In the data decoding circuit 8, multiplexed data from the data encoding circuit 7 is supplied to the demultiplexer 85 through the transmission line 9 and an input terminal 86. The multiplexed data is demultiplexed by the demultiplexer 85. The initial value of the multiplexed data is supplied to the shift register 81 through the switching circuit 84 and the data signal of the multiplexed data is supplied to the adder 83. The adder 83 adds the input data and the random number supplied from the random number generator 82. The sum data is output through an output terminal 87. The random number is also supplied to the shift register 81 through the switching circuit 84. With the above arrangement, the initial value is set in the shift registers 71 and 82 at the beginning of transmission. Thereafter, the same random number is supplied to the shift registers 71 and 81.

The conventional data encoding/decoding circuits of the three systems present the following drawbacks.

In the first system, the reception data is input to the shift register and the random number is generated according to the content value of the shift register. If a data error occurs on the transmission line 3, the random numbers in the data encoding and decoding circuits 1 and 2 differ from each other while the false data is left in the shift register 21. As a result, the number of data errors tends to increase. In the second system, the same random number is used in response to the frame sync signal. The random number can be relatively easily descrambled, resulting in inconvenience. In the third system, although the problems posed by the first and second system can be solved, the initial value must be sent and received for each transmission cycle. If a wrong initial value is received or if even one clock is omitted during transmission or reception of data, all the data is lost until the next initial value is sent.

SUMMARY OF THE INVENTION

It is an object of the present invention to provide a data encoding/decoding circuit wherein the conventional drawbacks can be eliminated, the number of data errors is not increased, even if a data error occurs during transmission, and random numbers cannot be easily descrambled.

In order to achieve the above object of the present invention, there is provided a data encoding/decoding circuit comprising a data encoding circuit for supplied with transmission data for encoding the transmission data and transmitting encoded data, and a data decoding circuit for receiving reception data sent from the data encoding circuit, decoding the reception data, and outputting decoded data, the data encoding circuit comprising a first clock for outputting a time signal, first time setting means for setting a specific time in the first clock, first random number generating means for generating a first random number as a function of time counted by the first clock, converting means for receiving the transmission data and converting the transmission data with the first random number, and frame sync inserting means for dividing output data from the converting means into frames, inserting a frame sync signal in each frame, and transmitting sum data as an output from the data encoding circuit at a predetermined time, and the data decoding means comprising a second clock for outputting a second time signal, second time setting means for setting the second time in the second clock, frame sync extracting means for receiving the reception data and extracting the frame sync signal therefrom, time correcting means for correcting the second time in response to the frame sync signal, second random number generating means for generating a second random number as a function of the corrected second time, and inverting means for inverting output data from the frame sync extracting means with the second random number and outputting the inverted data as decoded data.

DETAILED DESCRIPTION OF THE PREFERRED EMBODIMENTS

The present invention will be described in detail with reference to the accompanying drawings.

Figure 1:
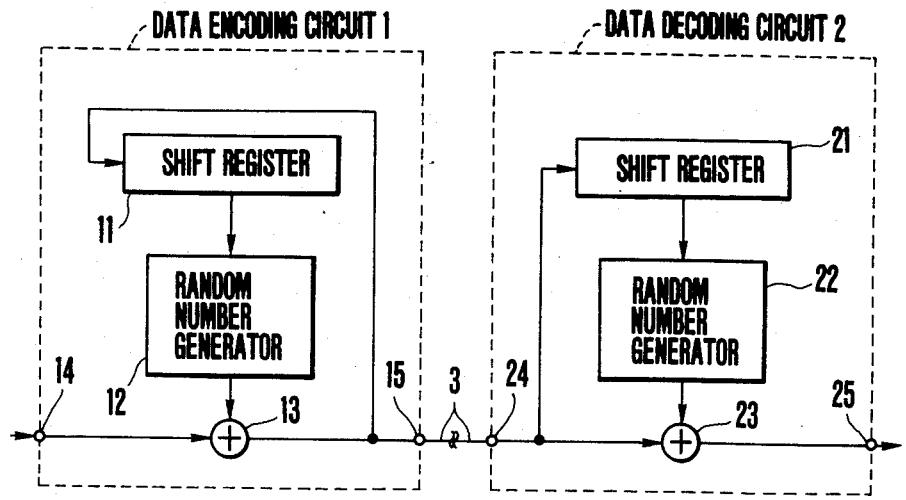
FIGS. 1, 2, and 3 are respectively block diagrams of conventional data encoding/decoding circuits.
Figure 2:
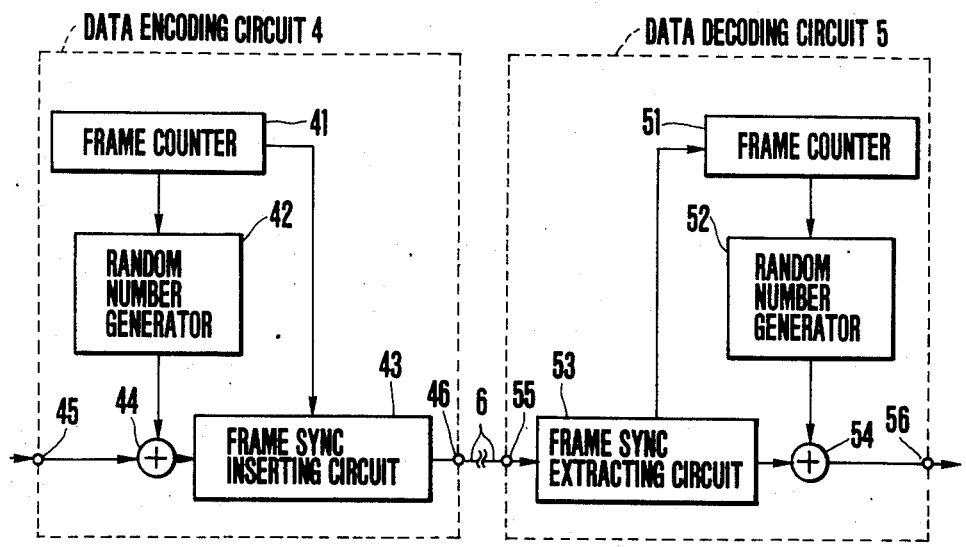
Figure 3:
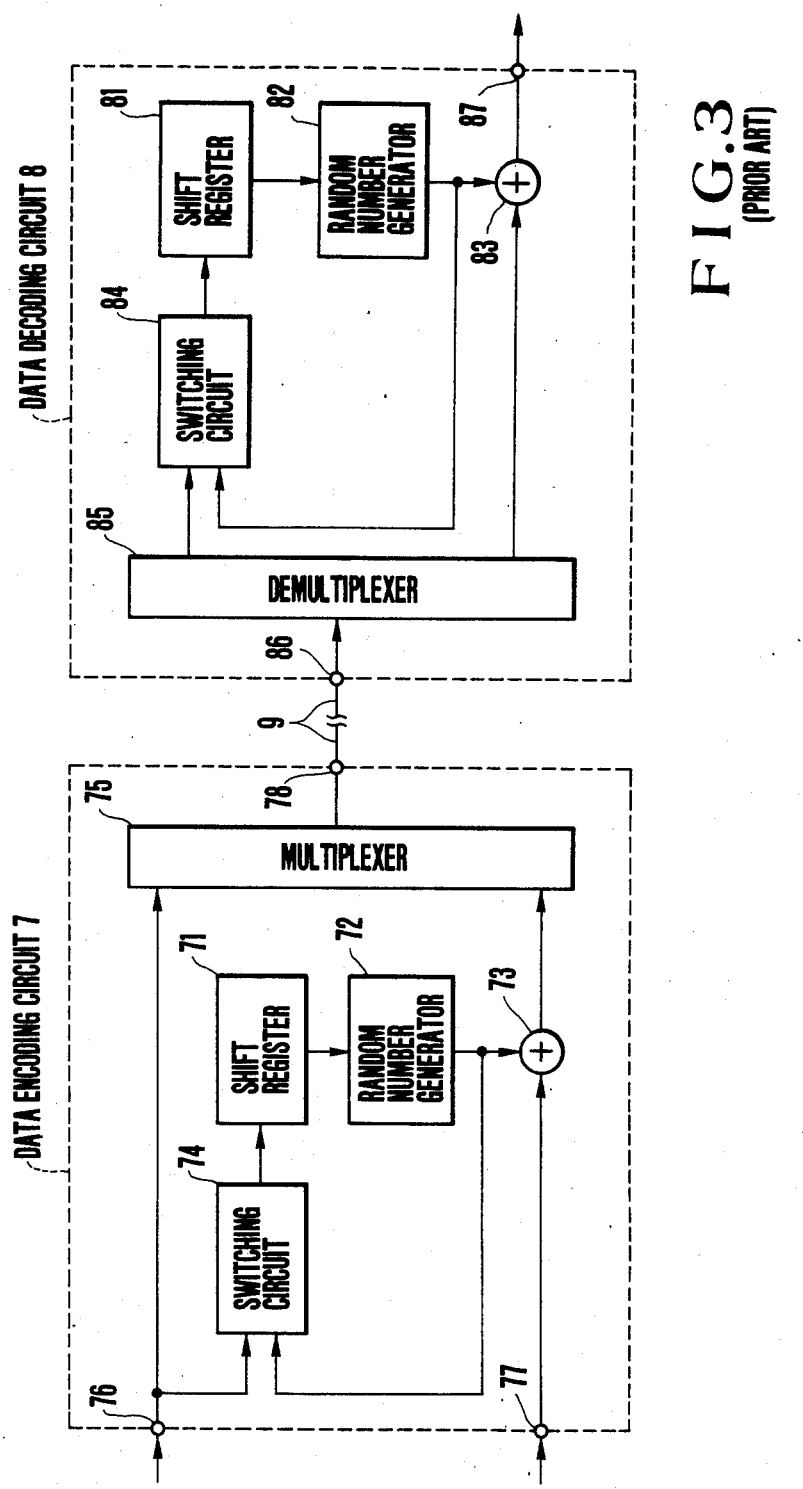
Figure 4:
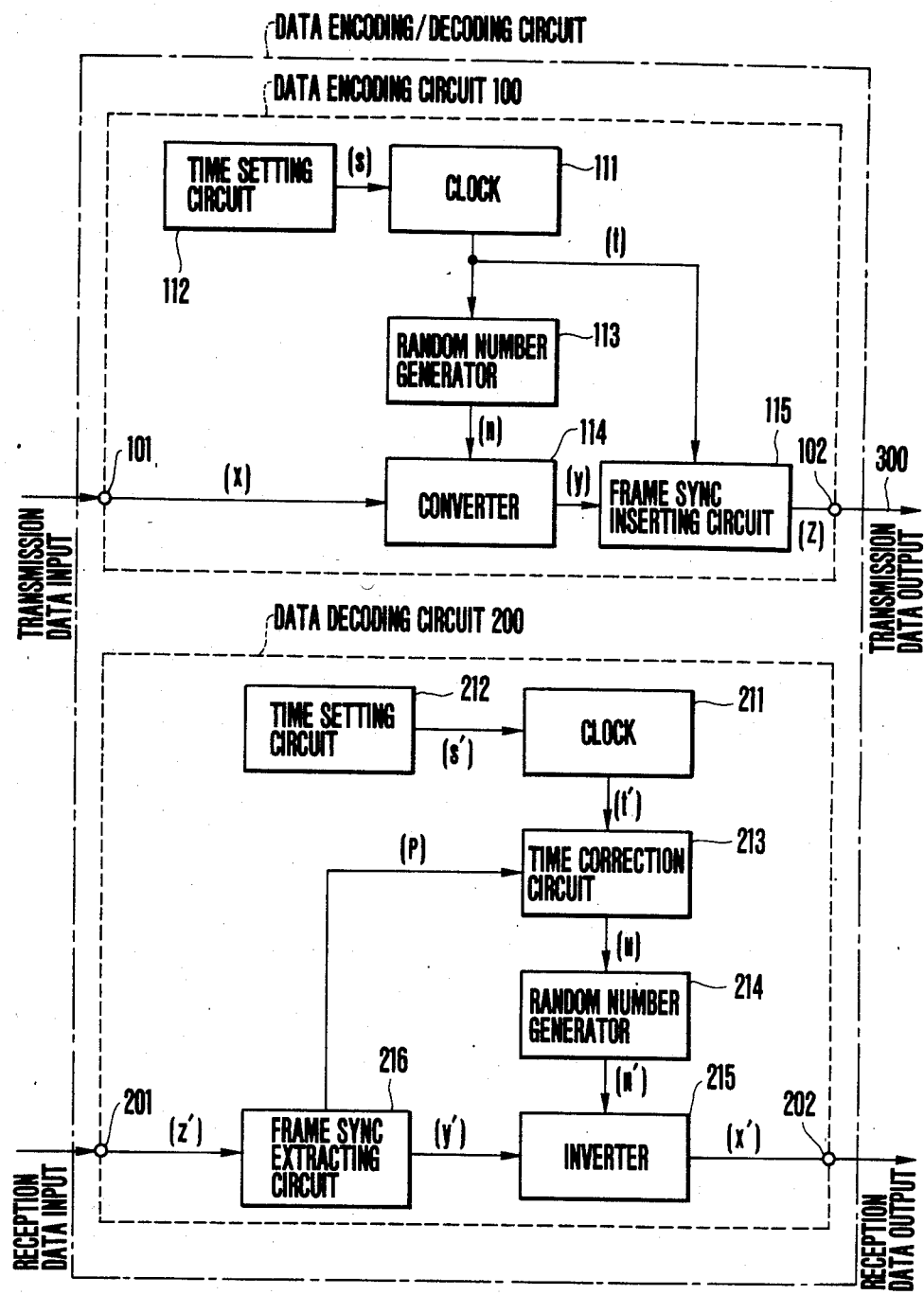
FIG. 4 is a block diagram of a data encoding/decoding circuit according to an embodiment of the present invention.

FIG. 4 shows a data encoding/decoding circuit according to an embodiment of the present invention.

Referring to FIG. 4, a data encoding circuit 100 comprises a clock 111 for outputting current time t, a time setting circuit 112 for setting the correct time in the clock 111, a random number generator 113 for generating a random number n as a function of an output t from the clock 111, a converter or transformer 114 for converting input data x (to be transmitted) supplied to a data input terminal 101 according to the random number n and outputting converted data y, and a frame inserting circuit 115 for inserting frame sync signals in data y at specific times $t = t_0, t_1, t_2, \ldots, t_n, \ldots$. An output z from the frame sync inserting circuit 115 is sent onto a transmission line 300 through an output terminal 102. The converter 114 performs a calculation $y = x \oplus n$ (where $\oplus$ is exclusive OR).

In a data decoding circuit 200, transmission data z' from a data encoding circuit 100 of another data encoding/decoding circuit through an input terminal 201. The data z' is supplied to a frame sync extracting circuit 216 to extract frame sync signals. The frame sync extracting circuit 216 outputs a signal y' without frame sync signals. At the same time, the frame sync extracting circuit 216 outputs a frame sync signal P. Since the frame sync signals are respectively inserted by the frame sync inserting circuit 115 at the specific times $t = t_0, t_1, t_2, \ldots, t_n, \ldots$, the frame sync signal P is used as a reference signal for a time correction circuit 213. A clock 211 outputs a signal t' representing the current time. A time setting circuit 212 supplies a time setting signal s' to the clock 211 to set the correct time of the clock 211. The time correction circuit 213 receives the signal t' from the clock 211 and the frame sync signal P from the frame sync extracting circuit 216, and uses the frame sync signal P to correct fixed delays caused by frame sync insertion, propagation time, and the like, and a difference between times counted by the clock 111 in the data encoding circuit 100 and the clock 211 in the data decoding circuit 200. The corrected signal is output as a time signal u from the time correction circuit 213. A random number generator 214 generates a random number n' as a function of the corrected time u. The random number generator 214 has the same function as that of the random number generator 113 in the data encoding circuit 100. An inverter or inverse transformer 215 inverts output data from the frame sync extracting circuit 216 according to the random number n' from the random number generator 214. Output data x' from the inverter 215 appears at an output terminal 202. More specifically, the inverter 215 performs a calculation $x' = y' \oplus n'$, i.e., the inverter 215 inverts the data converted by the converter 114.

The operation of the data encoding/decoding circuit in FIG. 4 will be described below.

Figure 6:
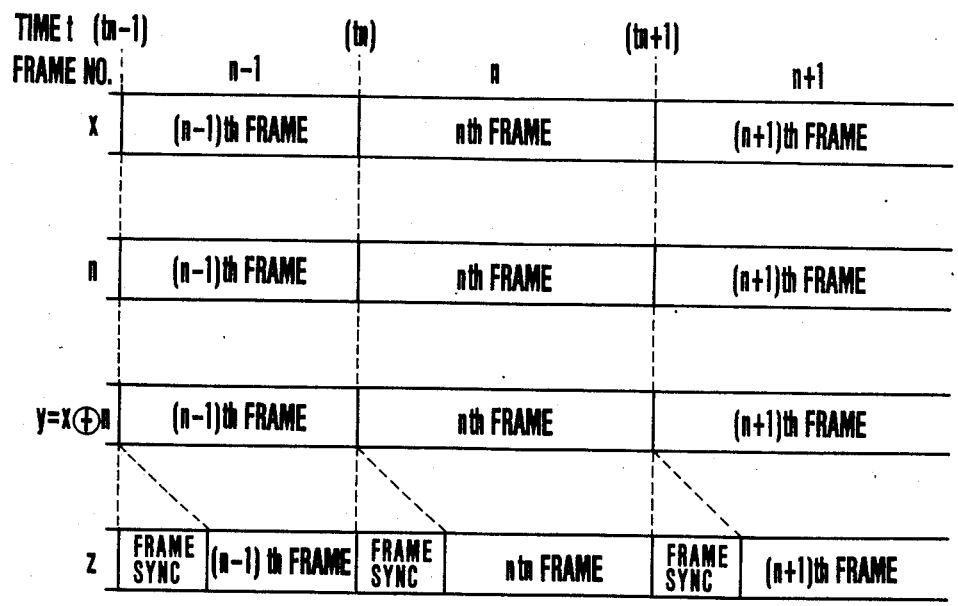
FIG. 6 is a timing chart showing signals in a data encoding circuit of FIG. 4.

The operation of the data encoding circuit 100 will be described with reference to FIG. 6 showing the timing relationship between data x, data y, and data z.

The time setting circuits 112 and 212 respectively set the same time in the clock 111 of the data encoding circuit 100 and the clock 211 of the data decoding circuit 200 at a given time, e.g., every morning. The time t is expressed together with the date so that the recursive factor is eliminated from the concept of time.

In the data encoding circuit 100, the random number generator 113 generates the random number n as a function of time t. This function is expressed as $n = f(t)$.

Figure 5:
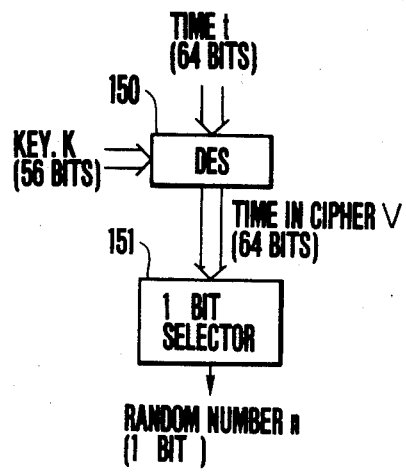
FIG. 5 is a block diagram of a random number generator in FIG. 4.

FIG. 5 is a block diagram for explaining known Data Encryption Standard (DES) used in this embodiment to establish function f. The DES is one of the encryption schemes wherein the value of the random number n cannot be easily decrypted without a key k, even if the time t is known. Referring to FIG. 5, the time t represented by 64-bit data and the key k represented by 56-bit data are input to a DES 150. The encrypted 64-bit data is output from the DES 150. Data v is supplied to a 1-bit selector 151 and the selector 151 selects 1 bit out of the 64 bits of the data v. The random number n is obtained as f(t).

Referring back to FIG. 4, the data x input to the data encoding circuit 100 is added by the converter 114 to the random number n. The exclusive ORed product y of the data x and the random number n is supplied to the frame sync inserting circuit 115. The frame sync inserting circuit 115 divides data y into frames at specific times $t = t_0, t_1, t_2, \ldots t_{n-1}, t_n,$ and $t_{n+1}$, and inserts a frame sync signal in each frame. The resultant data is sent as the transmission data z from the output terminal 102 onto the transmission line 300.

Figure 7:
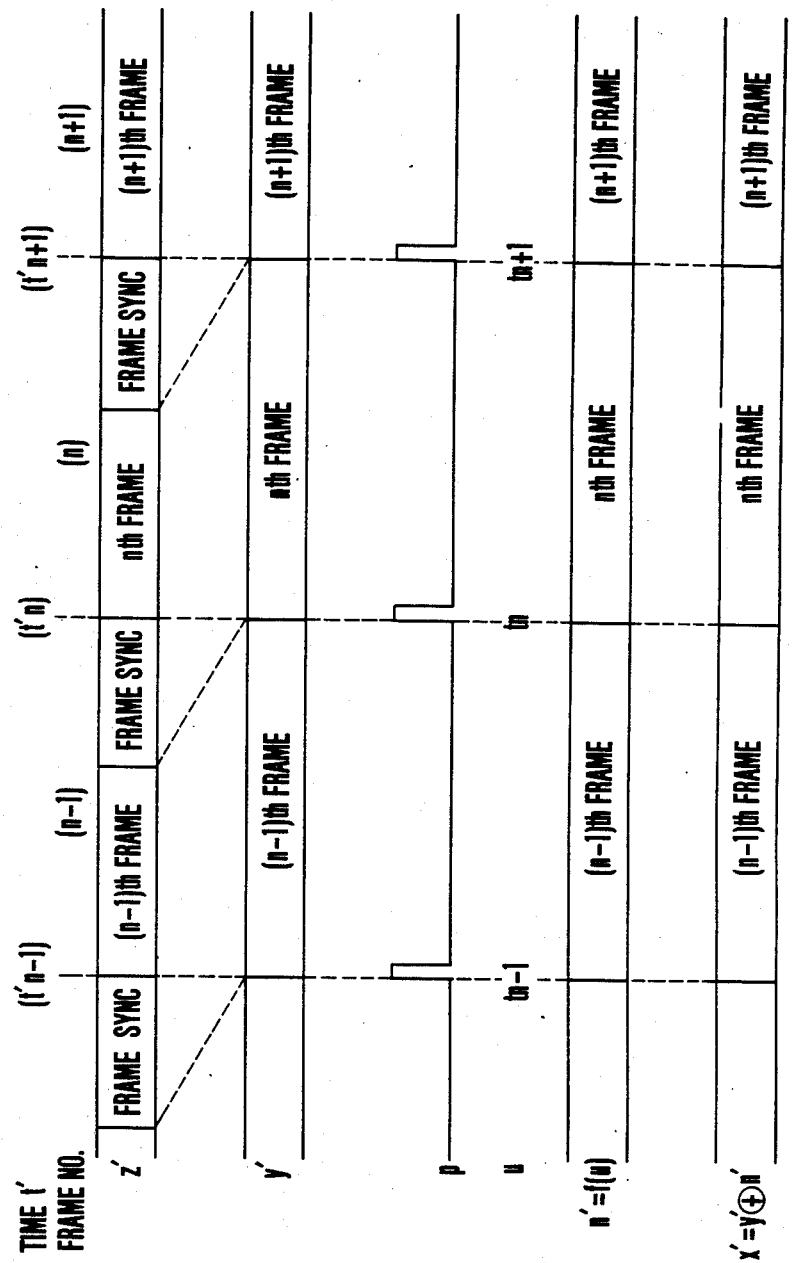
FIG. 7 is a timing chart of signals in a data decoding circuit of FIG. 4.

The operation of the data decoding circuit 200 will be described with reference to the timing chart of data signals z', y', P, u, n', and x' in FIG. 7. The reception signal z' input to the input terminal 201 is supplied to the frame sync extracting circuit 216.

The frame sync extracting circuit 216 detects frame sync signals from the input data z', and supplies the frame sync signals P to the time correction circuit 213 and the resultant converted data y' to the inverter 215. Each frame sync signal P is output at a boundary between the two adjacent frames, as shown in FIG. 7. When the boundaries of the frames are respectively matched with times $t = t_0, t_1, t_2, \ldots t_{n-1}, t_n, t_{n+1}, \ldots$ in the data decoding circuit 200, the time correction circuit 213 corrects the time so as to output the respective frame sync signal P at times $u = t_0, t_1, t_2, \ldots, t_{n-1}, t_n, t_{n+1}, \ldots$. That is, $$U = t' + d + \Delta t \qquad (1)$$

where $\Delta t: -T/2 \leq \Delta t < T/2$ d: is the correction term for correcting the fixed delay time caused by frame sync insertion or a propagation delay time;

t: is the correction time for a difference between the time counted by the clock 111 in the data encoding circuit 100 and the time counted by the clock 211 in the data decoding circuit 200; and T: is the length of time of the unit frame.

If the difference between the times counted by the clocks falls within the range of $\pm T/2$, the times are accurately corrected by the time correction circuit 213 so that the frame numbers and intraframe bit numbers of the data encoding and decoding circuits 100 and 200 can be completely synchronized.

Since the frame numbers cannot be detected by only the frame sync signals P, the above difference falls outside the range of $\pm T/2$, and the times differ from each other by NT ($N = \pm 1, \pm 2, \ldots$). For this reason, the times of the clocks in the data coding and decoding circuits 100 and 200 must be corrected to accurate times before the difference falls outside the range of $\pm T/2$. If the clocks are accurately corrected once a day and the clock precision falls within the range of $\pm 0.5$ sec/day, the frame period T must be designed to be longer than one second.

The random number generator 214 generates the random number $n' = f(u)$ as a function of the corrected time u. The function f is the same as that from the random number generator 113 in the data encoding circuit 100.

The inverter 215 calculates an exclusive ORed product of the converted signal y' and the random number n', and outputs the data x'. That is, $$x' = y' \oplus n' = y' \oplus f(u) \qquad (2)$$

When the difference between the times counted by the clocks in the data encoding and decoding circuits 100 and 200 falls within the range of $\pm T/2$, the data encoding circuit 100 is completely synchronized with the data decoding circuit 200. In this case, if $u = t$, $y' = y$ and $n' = n = f(u) = f(t)$, the following equation is derived $$\begin{aligned} x' &= y' \oplus n' \qquad (3) \\ &= y \oplus n' \\ &= x \oplus n' \oplus n' \\ &= x \end{aligned}$$

Even if a bit error occurs on the transmission line 300, the bit errors are not increased. In addition, the random number synchronization patterns are infinite in practice. Therefore, it is very difficult to decrypt the random number.

Figure 8:
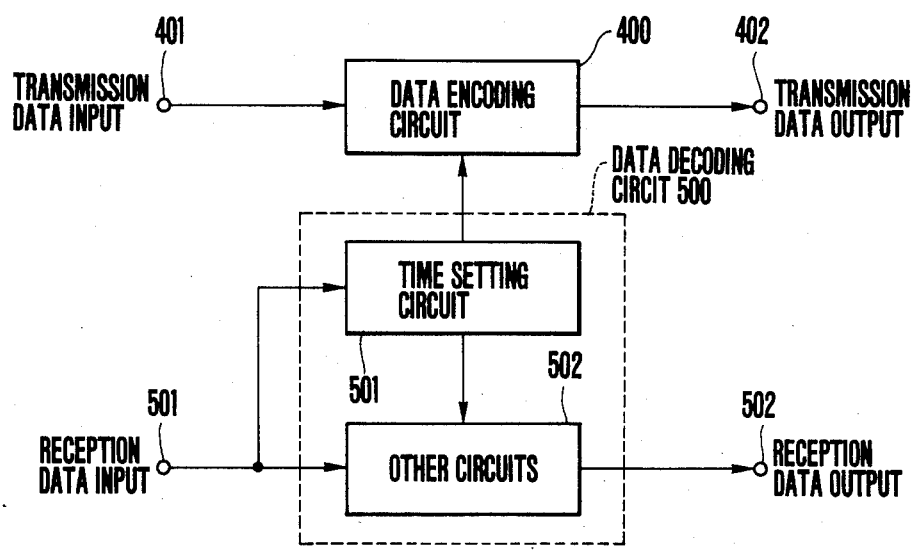
FIG. 8 is a block diagram of a data encoding/decoding circuit according to another embodiment of the present invention.

FIG. 8 shows another embodiment of the present invention. Referring to FIG. 8, a data encoding circuit 400 is the same as the data encoding circuit 100 in FIG. 4. A data decoding circuit 500 comprises a time setting circuit 501 and other circuits 502. The arrangement of the other circuits 502 are the same as those in FIG. 4. The time setting circuit 501 receives reception data and extracts time data multiplexed in the reception data. The time data is supplied to the data encoding circuit 400 and to circuits 502 in the data decoding circuit 500. Therefore, the clocks in the data encoding and decoding circuits 400 and 500 can be accurately set. Since time data can be transmitted once an hour from a main station, an error correction signal or the like can be used to achieve sufficiently high precision. In addition, if the time setting interval is shortened, the necessary frame length can be shortened.

According to the present invention as described above, the data encoding/decoding circuit includes clocks respectively arranged in the data encoding and decoding circuits. These clocks have a difference falling within the range of $\pm T/2$ (where T is the frame period). The times counted by these clocks are corrected in response to frame sync signals according to frame synchronization. The intraframe bit numbers of the encoding and decoding circuits are synchronized with each other. Therefore, the data encoding circuit is completely synchronized with the data decoding circuit, and random numbers are generated under this synchronization, thereby preventing an increase in data errors in the decoding circuit, even if a data error occurs on the transmission line.

In addition, the time is represented together with the date, and periodicity of the random numbers is lost in practice, thereby substantially preventing tapping and illegal decryption. Furthermore, since the initial random number need not be transmitted or received for each communication cycle, operation failure caused by an initial value reception error can be prevented.

What is claimed is:

1. A data encoding/decoding circuit comprising
a data encoding circuit supplied with transmission data for encoding the transmission data and transmitting encoded data, and
a data decoding circuit for receiving reception data sent from said data encoding circuit, decoding the reception data, and outputting decoded data, said data encoding circuit comprising
a first clock for outputting a time signal,
first time setting means for setting a specific time in said first clock,
first random number generating means for generating a first random number as a function of time counted by said first clock,
converting means for receiving the transmission data and converting the transmission data with the first random number, and
frame sync inserting means for dividing output data from said converting means into frames, inserting a frame sync signal in each frame, and transmitting sum data as an output from said data encoding circuit at a predetermined time, and
said data decoding means comprising
a second clock for outputting a second time signal,
second time setting means for setting the second time in said second clock,
frame sync extracting means for receiving the reception data and extracting the frame sync signal therefrom,
time correcting means for correcting the second time in response to the frame sync signal,
second random number generating means for generating a second random number as a function of the corrected second time, and
inverting means for inverting output data from said frame sync extracting means with the second random number and outputting the inverted data as decoded data.

2. A circuit according to claim 1, wherein said first and second clocks have an error falling within a range of $\pm T/2$, where T is a frame period of the transmission and reception data.

3. A circuit according to claim 1, wherein said time correction means comprises means for correcting a difference of times counted by said first and second clocks, and for correcting fixed delay times consisting of a data propagation delay time and a delay time upon insertion of the frame sync signal in said frame sync inserting means.

4. A circuit according to claim 1, wherein said converting means calculates an exclusive ORed product of the transmission data and the first random number, and said inverting means calculates an exclusive ORed product of the second random number and reception data which is generated from frame sync extracting means and which is separated from the frame sync signals.

* * * * *